Nov. 17, 1953 — H. A. PURSCHE — 2,659,284
TWO-WAY PLOW
Filed July 12, 1948 — 3 Sheets-Sheet 3

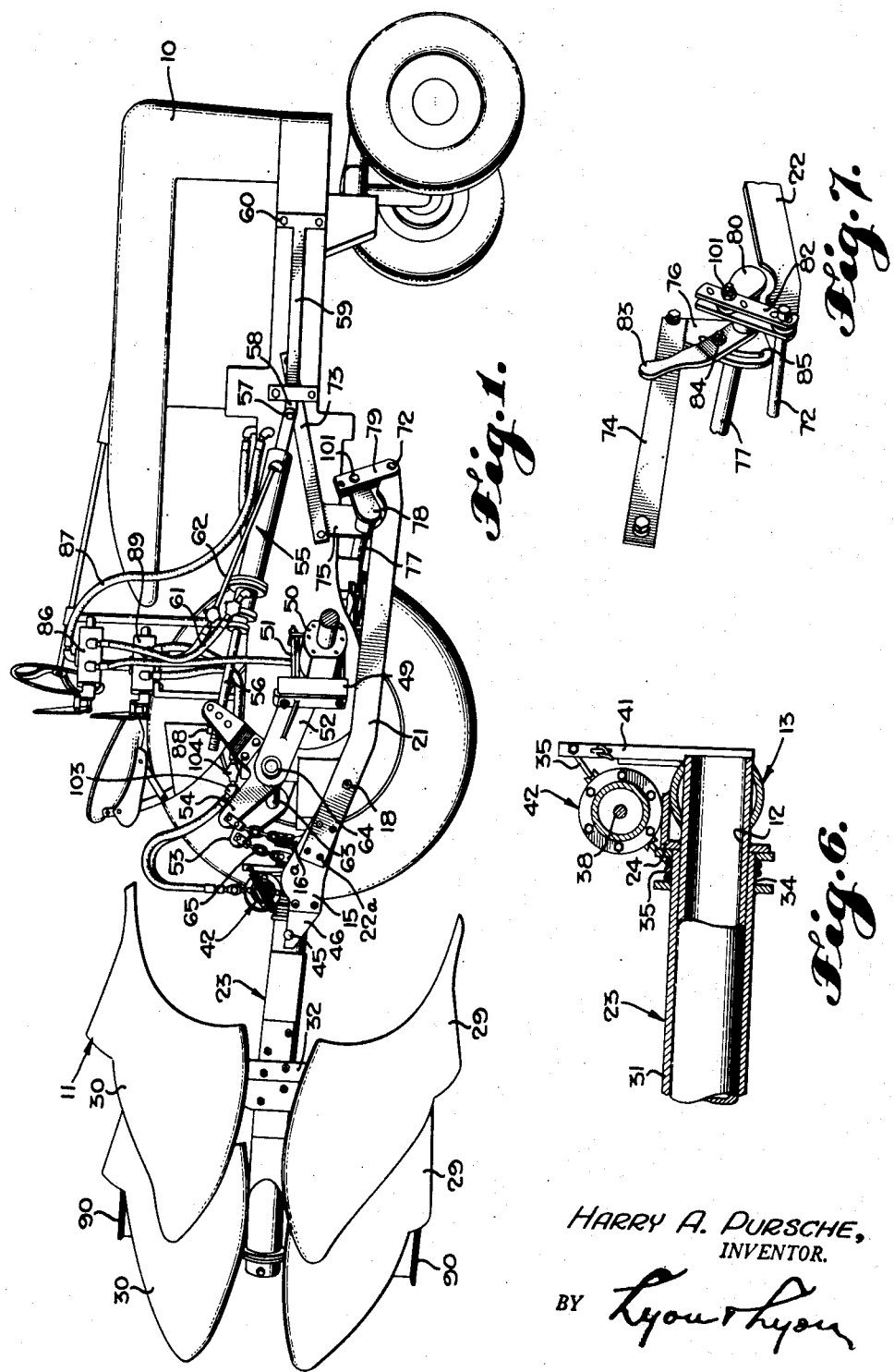

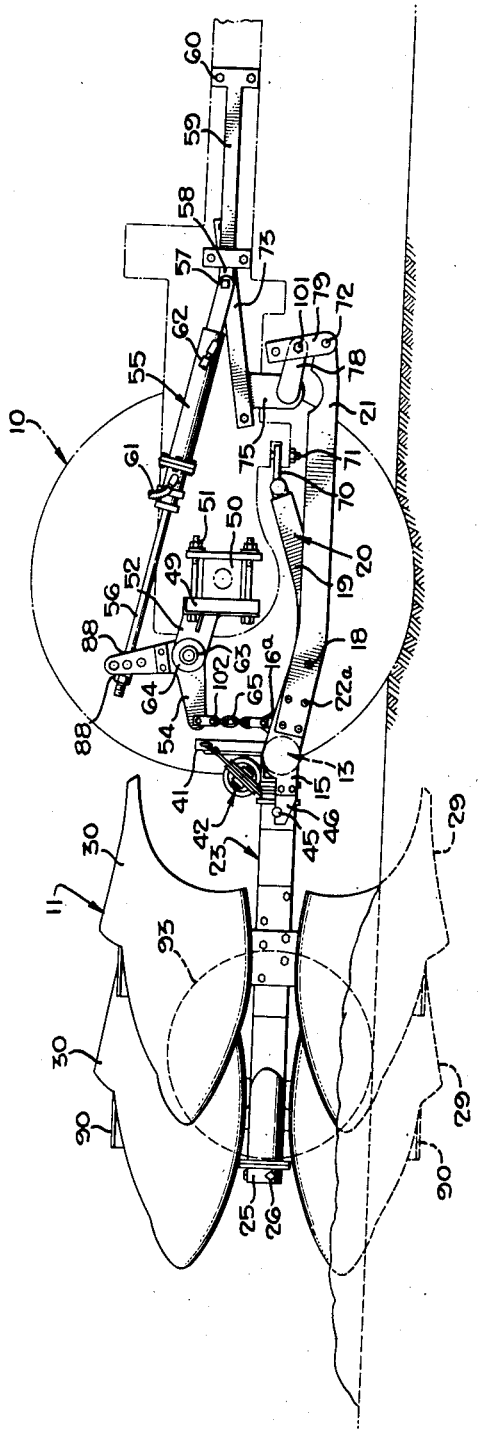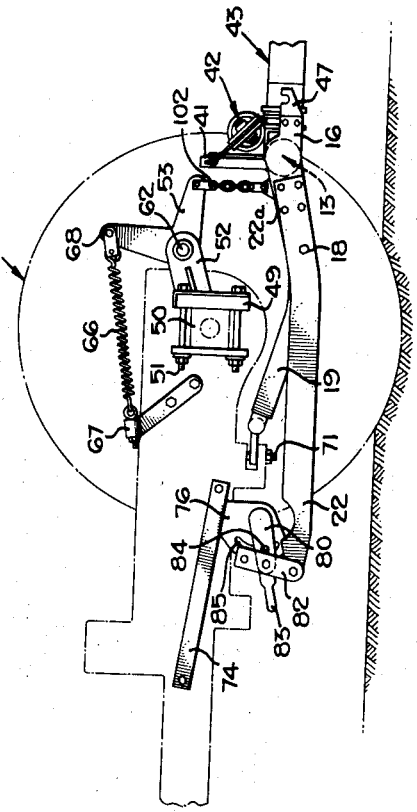

HARRY A. PURSCHE,
INVENTOR.
BY Lyon & Lyon
ATTORNEYS

Patented Nov. 17, 1953

2,659,284

UNITED STATES PATENT OFFICE 2,659,284

TWO-WAY PLOW

Harry A. Pursche, Gardena, Calif.

Application July 12, 1948, Serial No. 38,352

17 Claims. (Cl. 97—26)

This invention relates to agricultural implements and is particularly directed to a new and improved form of two way plow. In my prior applications, Serial No. 18,252, filed March 31, 1948, Serial No. 780,417, filed October 17, 1947, and Serial No. 760,846, filed July 14, 1947, now Patents 2,625,089, 2,625,091, and 2,625,090 respectively, granted January 13, 1953, I have shown and described two way plows which are supported on a frame provided with ground engaging wheels. Such devices are towed behind a tractor. The present application relates to a novel form of two way plow device adapted to be supported at least in part directly on a tractor, and the necessity for a supporting frame is thereby obviated. Furthermore, there are substantial manufacturing economies which can be obtained in connection with the relatively light-weight two way plow assemblies which are to be operated by small and medium size wheeled tractors.

Accordingly, it is the principal object of the present invention to provide a new and improved form of two way plow adapted to be carried on a tractor.

Another object is to provide a device of this type having novel means for maintaining the plowshares at the desired depth and cutting angle with relation to the soil being plowed.

Another object is to provide a tractor mounted two way plow which may optionally employ a depth controlling wheel adapted to roll on unplowed ground.

Another object is to provide a device of this type in which the draft load is applied at one point to the tractor and adjusting mechanism is provided at a location ahead of that point for controlling the angle at which the plowshares engage the soil.

A further object is to provide a two way plow of this type having adjustable shoes which may be employed in connection with the plowshares to regulate the depth of cut.

Other objects and advantages will appear hereinafter.

In the drawings, Figure 1 shows a side elevation of a tractor with one rear wheel removed and illustrating a preferred form of two way plow embodying my invention.

Figure 2 is a side elevation of the device in ground engaging position, parts of the tractor being shown in phantom line only.

Figure 3 is an elevation view taken from the other side of the tractor.

Figure 6 is a partial sectional elevation taken substantially on the lines 6—6 as shown in Figure 4.

Figure 7 is a fragmentary detail showing a portion of the mechanism for adjusting the angle of the plowshares.

Figures 4, 5:
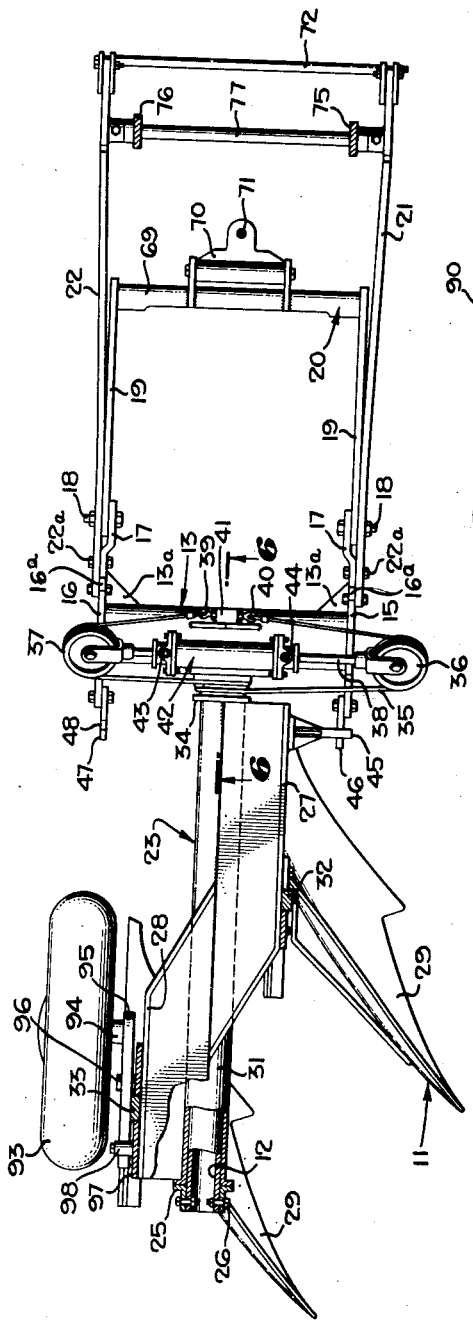
Figure 4 is a top plan view, the tractor and associated mechanism for raising and lowering the device being omitted for clarity of illustration.
Figure 5 is a perspective view showing the use of adjustable shoes on the plowshares for controlling the depth of cut when a rear supporting wheel is not employed.

Referring to the drawings, a tractor 10 of conventional type serves as a support for my two way plow device generally designated 11. This two way plow device includes a rearwardly extending stationary beam 12 having a stationary cross-beam 13 fixed to its forward end. Forwardly extending arms 15 and 16 are secured to opposite ends of the cross-beam 13. Gusset plates 13a may be provided to stiffen the connection between the cross-member 13 and the arms 15 and 16. The arms 15 and 16 are each laterally offset as shown at 17 and their forward ends are connected by pivot bolts 18 to the tension elements 19 of the draft frame 20. Extension arms 21 and 22 are removably secured to the arms 15 and 16 by means of the removable bolts 22a. The arms 15 and 16 and their lugs 16a comprise support means by which the plow assembly is raised and lowered with respect to the tractor 10. The draft means, including the draft frame 20, is attached to the support means through the agency of the pivot bolts 18. The draft frame 20 and the forward ends of the extension arms 21 and 22 are connected to the tractor in the manner described in detail hereinafter.

A carrier 23 is turnably mounted on the longitudinally extending beam member 12 and is confined between the angle member 24 fixed on the forward end of the beam 12 and the removable collar 25 which is attached to the rearward end of the beam 12 by means of suitable bolts 26. A forward lateral projection 27 and a rearward lateral projection 28 are provided on the carrier 23 and serve as supports for the right hand plowshares 29 and the left hand plowshares 30 respectively.

The projections 27 and 28 may comprise sections of steel plate welded to the central pipe 31 of the carrier 23. Vertically extending standards 32 and 33 are bolted or otherwise attached to the lateral projections 27 and 28 respectively, and each of these standards carries a right hand plowshare at one end and a left hand plowshare at the other. A spooling drum 34 is provided on the forward end of the carrier 23. A flexible cable 35 is wrapped around the drum two or three times and then passed over pulleys 36 and 37 which are carried on opposite ends of a piston rod 38. The ends of the cable are secured by suitable means 39 and 40 to a central stationary upright 41 fixed relative to the cross member 13. The piston rod 38 extends from both ends of a double-acting hydraulic cylinder assembly 42. This cylinder assembly 42 extends parallel to the cross member 13 and is supported upon it by means of the angle member 24. Hydraulic lines 43 and 44 communicate with opposite ends of the hydraulic cylinder 42. When pressure is supplied through the hydraulic line 43, the pulley 36 is moved outwardly and the pulley 37 is retracted. This action serves to roll the carrier 23 to bring the right hand plowshare 29 into operative position. Conversely, when pressure is admitted through the hydraulic line 44, the pulley 37 is extended and the pulley 36 is retracted so that the carrier 23 is rotated to bring the left hand plowshare 30 into operative position.

Means are provided for limiting the angle of travel of the carrier 23 and, as shown in the drawings, this means includes an abutment pin 45 fixed by any convenient means to the forward end of the lateral projection 27. A pair of stop elements 46 and 47 are bolted or otherwise attached to the rearward portions of the supporting arms 15 and 16 respectively. Each of the stop elements 46 and 47 is provided with a recess 48 in its upper surface, which is adapted to receive the abutment pin 45. The stop elements 46 and 47 may be adjusted vertically with respect to the cross member 13 in order to adjust the angular position of the carrier in its extreme end positions. The engagement of the abutment pin 45 with one of the recesses 48 also serves to provide additional stiffness against lateral deflection of the carrier under the loads imposed by engagement of the plowshares with the ground.

Means are provided for supporting the two way plow assembly 11 upon the conventional wheeled tractor 10. As shown in the drawings, this means includes a pair of clamp support assemblies 49 which are adapted to be secured to the non-circular shaft housings 50 provided on the tractor. Bolts 51 are provided to facilitate easy installation and dismantling of the assemblies 49. A rearwardly extending support arm 52 is provided on each of the assemblies 49 and a pair of bellcranks 53 and 54 are pivotally mounted on the arms 52. A power cylinder assembly 55 includes a piston rod 56 which is pivotally secured at its extending end to the upper arm of the bellcrank 54. The forward end of the power cylinder 55 is pivotally connected at 57 to an ear 58 carried on the demountable subframe 59 attached to the main tractor frame 10 by means of bolt 60. Hydraulic lines 61 and 62 communicate with opposite ends of the power cylinder assembly 55 so that the piston rod 56 may be extended or retracted as desired, thereby pivoting the bellcrank 54 with respect to the arms 52. The bellcranks 53 and 54 are integrally connected by a shaft 63 which projects through bearing hubs 64 provided in the arms 52. Accordingly, pivotal movement of the bellcrank 54 under the action of the power cylinder assembly 55 serves to effect similar movement of the bellcrank 53 on the other side of the tractor. Chains 65 serve to connect the rearwardly extending arms of the bellcranks 53 and 54 with the lugs 16a on the support arms 15 and 16 respectively.

From the above description, it will be understood that when the piston rod 56 is retracted, the chains 65 act to lift the two way plow assembly 11. The weight of the two way plow assembly may be partially counterbalanced by means of a tension spring 66 as shown in Figure 3. The forward end of this spring is attached to the tractor frame by suitable means 67, and the rearward end is connected at 68 to the upper arm of the bellcrank 53. The weight of the two way plow assembly as thus counterbalanced is effective in increasing the traction of the rear wheels of the tractor.

The draft frame 20, including the tension elements 19 and cross member 69 is provided with a pivoted hitch bracket 70 which is adapted to receive the draft bolt 71. This draft bolt 71 is carried by the tractor frame at a central location ahead of the rear wheel axles. The entire draft required for pulling the plowshares through the ground is carried by the draft frame 20 and draft bolt 71.

The extension arms 21 and 22, which are bolted to the arms 15 and 16 respectively by means of bolts 22a, extend forwardly of the pivot bolt 71 and serve as a means for adjusting the angular elevation of the longitudinal beam member 12. The angle of attack of the plow points is regulated by this means. The extreme forward ends of the arm extensions 21 and 22 are connected by a cross bar 72, so that the extension arms 21 and 22 may be raised and lowered as a unit. The means for raising and lowering the forward ends of the arm extensions includes a pair of brackets 73 and 74 fixed on the tractor frame by any convenient means and provided with downwardly extending plates 75 and 76 respectively. A control shaft 77 extends under the tractor frame and is pivotally supported in the plates 75 and 76. One end of the control shaft 77 carries the crank arm 78, and this crank arm is connected to operate the extension arm 21 by means of the adjustable link 79. The other end of the control shaft 77 is provided with a crank arm 80 which is connected to operate the extension arm 22 by means of the adjustable link 82. Means are provided for turning the shaft 77 and, as shown, this means includes a lever 83 fixed to the shaft 77 adjacent the plate 76. The lever may be secured in adjusted angular position by means of a clamping bolt 84 which operates in an arcuate slot 85 provided in the plate 76.

From the above description, it will be understood that angular movement of the control lever 83 serves to provide a fine adjustment for the elevation of the forward ends of the extension arms 21 and 22. The extension arms 21 and 22, together with the means for adjusting the elevation of their forward ends, are not required to carry any of the draft load imposed by the plowshares. This draft load is carried by the draft frame 20 and draft bolt 71.

In operation, the two way plow assembly 11 is carried on the tractor 10 and, in the position as shown in Figure 1, two of the plowshares rest on the ground surface. The carrier 23 and plowshares may be raised clear of the ground by operation of the lift control valve 86 which controls the operation of the power cylinder 55 through the hydraulic lines 61 and 62. Pressure fluid is delivered to the valve 86 via a conduit 87 connected to the outlet of a hydraulic pump (not shown) which is driven by the tractor engine. The power cylinder assembly 55 turns the bellcranks 54 and 53 so that the chains 65 raise the two way plow assembly and lift the plowshares clear of the ground. The tractor may then be driven in the normal fashion. When it is desired to commence plowing operations, the valve 86 is actuated to cause the power cylinder assembly 55 to lower the two way plow assembly by rotation of the bellcranks 53 and 54. The piston rod 56 reaches the limit of its travel in the position shown in Figure 2, and this controls the depth to which the plowshares enter the ground. The depth of cut may be varied by changing the position of the nuts 88 on the piston rod 56 so that the angular position of the bellcranks 54 and 53 may be adjusted with respect to the fully extended position of the piston rod 56. The carrier 23 is maintained at the correct angle by varying the position of the forward ends of the extension arms 21 and 22. This latter adjustment is accomplished by manipulation of the control lever 83 in the manner pointed out above.

The right hand plows 29 or left hand plows 30 are lowered into plowing position while the tractor is moving forward, and the plows are withdrawn at the end of the furrow while the forward motion of the tractor continues. The carrier 23 is elevated so that the plows clear the ground level and the tractor is turned around to return along the furrow previously plowed. The valve 89 is then operated to deliver hydraulic fluid through the hydraulic line 43 and to permit fluid to return to the pump by way of hydraulic line 44. The rollover cylinder 42 then retracts pulley 36 and extends pulley 37 so that the carrier 23 is rotated on the longitudinal beam 12, and the left hand plowshares 30 are turned toward ground-engaging position. The valve 89 is suitably connected to the pump by hydraulic conduits not clearly shown.

While the tractor is moving forward, the plow assembly is again lowered into plowing position by suitable operation of the power cylinder assembly 55. At the end of the furrow, left hand plowshares 30 are raised out of ground-engaging position, the tractor is turned around, the right hand plowshares are rotated to a ground-engaging position, and the cycle of operation is repeated.

It is desirable that the right hand plowshares on each of the standards 32 and 33 be mounted symmetrically with respect to the longitudinal beam 12, for any difference in relative position may result in variation in depth of cut. Manufacturing tolerances may not permit accurate assembly of the plowshares with respect to the standards 32 or 33. Accordingly, it may be necessary or desirable to provide supplementary means for insuring that the right and left hand plowshares cut exactly the same depth. As shown in Figure 5, a preferred means for accomplishing this result comprises the adjustable shoe members 90 which may be attached to the plowshares by means of suitable flat-head bolts 91. The shoe is provided with an upturned nose portion 92. The bolt holes in the shoes 90 are made sufficiently large to make angular adjustment of the shoes relative to the plowshares. If it is desired to have the particular plowshare make a deeper cut, the corresponding shoe is lowered so that the plow point will dig in deeper. Conversely, if the point is digging too deeply, the shoe is raised relative to the plowshare.

In Figures 2 and 4, I have shown a supporting wheel 93 which may be employed, if desired, to regulate the depth of cut very accurately. The wheel is carried on an axle 94 mounted at the forward end of an arm 95. The arm 95 is pivotally supported by means of a trunnion 96 carried on a bracket 97. The bracket 97 may be attached to the carrier 23 by any convenient means. Adjustable stops 98 are provided above and below the arm 95, as clearly shown in Figure 5, to limit the angular movement of the arm 95. The stops 98 may be moved vertically along the slots 99 provided in the bracket plate 100 and may be fixed at any desired position. The spacing of the stops is adjusted so that when the wheel 93 rolls on the unplowed ground the plowshare cuts to the desired depth. The wheel operates on unplowed ground when either the right hand or left hand plowshares are engaged in the plowing operation.

It will be noted that the position of the ground-engaging wheel 93 is substantially in advance of the standard 33, and therefore the wheel does not roll on a crumbling wall at the side of the furrow but rolls sufficiently in advance of the moldboard of the plow to insure a solid support for the wheel.

Ordinarily it is not necessary to use both the wheel 93 and the shoes 90. Either one or the other may be employed to control the cutting depth of the right and left hand plowshares.

When it is desired to disconnect the two way plow assembly from the tractor 10 in order that the latter may be free to perform other work, the pivot bolts 101 near the forward ends of the extension arms 21 and 22 are disconnected and the draft bolt 71 is withdrawn. The bolts 102 at the upper ends of the chains 65 are also withdrawn. The hydraulic lines 43 and 44 are disconnected at the fittings 103 after the shut-off valves 104 have been closed. This completes the separation of the two way plow device from the structure. The clamp assemblies 49, bellcranks 53 and 54, hydraulic power cylinder 55, valves 86 and 89 and their associated hydraulic connections remain on the tractor.

The device shown in the drawings is also useful in connection with ground engaging implements other than plows. The carrier 23 and plow assemblies may be removed as a unit from the beam 12 upon removal of the bolts 26 holding the collar 25 in place. The plow assembly may be rested on the ground, the collar 25 removed, and the tractor moved forwardly to retract the beam 12 out of the carrier 23. The beam 12 then may be reinserted into a suitable opening or recess provided in any tool or implement used in connection with the tractor. The hydraulic apparatus for raising and lowering the beam 12 enables the tractor operator to align the beam 12 with such opening or recess. The tractor is then backed up to insert the beam 12 into the opening or recess, and upon attachment of the holding collar 25 the assembly is then mounted on the beam and may be lifted by means of the hydraulic apparatus described above. In this way interchangeable devices may be mounted on the beam 12. It will be understood that plow assemblies having different sized plow shares may thus be conveniently installed on the same beam 12.

Having fully described my invention, it is to be understood that I do not wish to be limited to the details herein set forth, but my invention is of the full scope of the appended claims.

I claim:
1. In a two-way plow assembly adapted to be carried by a tractor, the combination of a longitudinal beam extending in the direction of normal travel of the plow assembly, a cross member fixed at the forward end of the longitudinal beam, a carrier turnably mounted on the longitudinal beam and provided with a right hand plow and a left hand plow, means to turn the carrier on the longitudinal beam to bring either plow into operative position, support arms at the opposed ends of said cross member adapted to be carried by the tractor whereby the plow assembly may be raised and lowered, draft means pivotally connected to the support arms, and means including longitudinal elements extending forwardly from said arms for varying the inclination of the longitudinal beam.

2. In a two-way plow assembly adapted to be carried by a tractor, the combination of a longitudinal beam extending in the direction of normal travel of the plow assembly, a cross member fixed at the forward end of the longitudinal beam, a thrust absorbing element at the rearward end of the longitudinal beam, a carrier turnably mounted on the longitudinal beam between the cross member and the thrust absorbing element and provided with a right hand plow and a left hand plow, means including a hydraulic cylinder assembly carried on the cross member and adapted to rotate the carrier on the longitudinal beam to bring either plow into operative position, support means at the opposed ends of said cross member adapted to be carried by the tractor whereby the plow assembly may be raised and lowered, and means associated with the support means for varying the inclination of the longitudinal beam.

3. In a two-way plow assembly adapted to be carried by a tractor, the combination of a longitudinal beam extending in the direction of normal travel of the ply assembly, a cross member fixed at the forward end of the longitudinal beam, a thrust absorbing element at the rearward end of the longitudinal beam, a carrier turnably mounted on the longitudinal beam between the cross member and the thrust absorbing element and provided with a right hand plow and a left hand plow, means to turn the carrier on the longitudinal beam to bring either plow into operative position, a wheel on the carrier adapted to roll on unplowed ground and to regulate the depth of cut of either of said plows, and support means at the opposed ends of said cross member adapted to be carried by the tractor.

4. In a two-way plow assembly, the combination of a longitudinal beam extending in the direction of normal travel of the plow assembly, a cross member fixed at the forward end of the longitudinal beam, a thrust absorbing element at the rearward end of the longitudinal beam, a carrier turnably mounted on the longitudinal beam between the cross-member and the thrust absorbing element and provided with a right hand plow and a left hand plow, means to turn the carrier on the longitudinal beam to bring either plow into operative position, an arm having a ground-engaging wheel rotatably mounted thereon, pivotal means for connecting the arm to the carrier at a location to the rear of the wheel axis, and adjustable stop means adapted to limit the pivotal movement of the arm and thereby regulate the depth of cut of either of said plows.

5. In a two-way plow assembly adapted to be carried by a tractor, the combination of a longitudinal beam extending in the direction of normal travel of the plow assembly, a cross-member fixed at the forward end of the longitudinal beam, a carrier mounted on the longitudinal beam and provided with ground-engaging means, support arms fixed to the opposed ends of said cross member and adapted to be carried by the tractor, a draft frame extending under the tractor and having tension arms each pivotally connected to one of said support arms, extension elements fixed to the support arms, and means on said extension elements positioned forward of the draft frame for adjusting the position of the support arms for varying the inclination of the longitudinal beam.

6. In a two-way plow assembly adapted to be carried by a tractor, the combination of a longitudinal beam extending in the direction of normal travel of the plow assembly, a cross member fixed at the forward end of the longitudinal beam, a carrier mounted on the longitudinal beam and provided with ground-engaging means, forwardly extending parallel support arms fixed to the opposed ends of said cross member and adapted to be carried by the tractor, a draft frame extending under the tractor and having parallel tension arms each pivotally connected to one of said support arms, extension elements fixed to the support arms, and lever means on said extension elements positioned forward of the draft frame for adjusting the position of the support arms for varying the inclination of the longitudinal beam.

7. In a two-way plow assembly adapted to be carried by a tractor, the combination of a cross member, a longitudinal beam extending in the direction of normal travel of the plow assembly, means integrally connecting the forward end of the longitudinal beam with the central portion of the cross member, ground-engaging means supported on the longitudinal beam, forwardly extending support arms fixed to the opposed ends of said cross member and adapted to be pendently supported by the tractor, a draft frame extending forwardly under the tractor and having tension arms pivotally connected to said support arms, extension elements fixed to the support arms, and single means on said extension elements positioned forward of the draft frame for adjusting the elevation of the front ends of both extension elements for varying the inclination of the longitudinal beam.

8. In a two-way plow assembly adapted to be carried by a tractor, the combination of: a longitudinal beam extending in the direction of normal travel of the plow assembly, a cross-beam fixed to and intersecting the forward end of the longitudinal beam, a thrust-absorbing element removably attached to the rearward end of the longitudinal beam, a carrier turnably mounted on the longitudinal beam between the cross-beam and the thrust-absorbing element and provided with a right-hand plow and a left-hand plow, power means on the cross-beam to turn the carrier on the longitudinal beam to bring either plow into operative position, stop means on the cross-beam to limit turning movement of the carrier in either direction, and support means at the opposed ends of the cross-beam adapted to be carried by the tractor.

9. In a two-way plow assembly adapted to be carried by a tractor, the combination of: a longitudinal beam extending in the direction of normal travel of the plow assembly, a cross-beam fixed to and intersecting the forward end of the longitudinal beam, a thrust-absorbing element removably attached to the rearward end of the longitudinal beam, a carrier turnably mounted on the longitudinal beam between the cross-beam and the thrust-absorbing element and provided with a right-hand plow and a left-hand plow, power means on the cross-beam to turn the carrier on the longitudinal beam to bring either plow into operative position, stop means on the cross-beam to limit turning movement of the carrier in either direction, support means at the opposed ends of the cross-beam adapted to be carried by the tractor, and draft means pivotally connected to the support means.

10. In a two-way plow assembly adapted to be carried by a tractor, the combination of: a longitudinal beam extending in the direction of normal travel of the plow assembly, a cross-beam fixed to and intersecting the forward end of the longitudinal beam, a thrust-absorbing element removably mounted on the rearward end of the longitudinal beam, a carrier turnably mounted on the longitudinal beam between the cross-beam and the thrust-absorbing element, the carrier being provided with a right-hand plow and a left-hand plow angularly spaced substantially one-half revolution apart, power means including a double-acting hydraulic cylinder assembly on the cross-beam operatively connected to turn the carrier through substantially one-half revolution in either direction on the longitudinal beam to bring either plow into operative position, stop means on the cross-beam to limit turning movement of the carrier in either direction, and support means at the opposed ends of said cross-beam adapted to be carried by the tractor.

11. In a two-way plow assembly adapted to be carried by a tractor, the combination of: a longitudinal beam extending in the direction of normal travel of the plow assembly, a cross-beam fixed to and intersecting the forward end of the longitudinal beam, a thrust-absorbing element removably attached to the rearward end of the longitudinal beam, a carrier turnably mounted on the longitudinal beam between the cross-beam and the thrust-absorbing element, the carrier having a right-hand plow and a left-hand plow angularly spaced substantially one-half revolution apart, a spooling drum fixed on the forward end of the carrier, a cable spooled on the drum, a double-acting hydraulic cylinder assembly mounted on the cross-beam and extending parallel thereto, means operatively connecting the power cylinder assembly to said cable whereby the carrier may be turned in either direction relative to the longitudinal beam, support arms fixed to the opposed ends of the cross-beam, stop means on the support arms to limit turning movement of the carrier in either direction, and means whereby the support arms may be carried by the tractor.

12. In a two-way plow assembly adapted to be carried by a tractor, the combination of: a frame, laterally spaced connection means on the frame for supporting the frame from a tractor, a carrier provided with a right-hand plow and a left-hand plow, means turnably mounting the carrier upon the frame for turning movement about a longitudinal axis, power means for turning the carrier to bring either plow into operative position, said power means including a hydraulic actuator carried on the frame, a part fixed to the carrier, an elongated flexible tension element having an intermediate portion extending around and engaging said part, and means operatively connecting said flexible tension element for actuation by said hydraulic actuator.

13. In a two-way plow assembly adapted to be carried by a tractor, the combination of: a frame, laterally spaced connection means on the frame for supporting the frame from a tractor, a carrier provided with a right-hand plow and a left-hand plow, means turnably mounting the carrier upon the frame for turning movement about a longitudinal axis, power means for turning the carrier to bring either plow into operative position, said power means including a part fixed to the carrier, an elongated flexible tension element having an intermediate portion extending around and engaging said part, a transverse member movably mounted upon the frame, means spaced along the length of said member operatively engaging the flexible tension element, and means including a hydraulic actuator on the frame for shifting said transverse member.

14. In a two-way plow assembly adapted to be carried by a tractor, the combination of: a frame, laterally spaced connection means on the frame for supporting the frame from a tractor, a carrier, means turnably mounting the carrier upon the frame for turning movement about a longitudinal axis spaced above the ground, the carrier being provided with a right-hand plow and a left-hand plow each radially spaced from said axis, power means for turning the carrier to bring either plow into operative position, said power means including a hydraulic actuator carried on said frame, a rotary part fixed coaxially to the carrier, an elongated element engaging said part and adapted to turn it, and means operatively connecting said elongated element for actuation by said hydraulic actuator.

15. A two-way plow assembly adapted to be carried on a tractor provided with a hydraulic system including a control valve, comprising in combination: a frame adapted to be supported on the tractor and raised and lowered thereby, a carrier turnably mounted on the frame and spaced above the ground, the carrier being provided with a plurality of ground-engaging plow means for producing either a right-hand furrow or a left-hand furrow, hydraulic power means on the frame for turning the carrier relative to the frame to either of two operative positions to cause the plow means to produce a right-hand furrow or a left-hand furrow as desired, and conduits forming hydraulic connections between the control valve on the tractor and the hydraulic power means on the frame.

16. In a two-way plow assembly adapted to be carried by a tractor, the combination of a longitudinal beam extending in the direction of normal travel of the plow assembly, a cross member fixed at the forward end of the longitudinal beam, a carrier mounted for movement on the longitudinal beam and provided with ground-engaging plow means, means for turning the carrier relative to the longitudinal beam, forwardly extending support arms at the opposed ends of said cross member adapted to be carried by the tractor whereby the plow assembly may be raised and lowered, and means connected with the support arms and adapted to extend forwardly under the tractor for varying the inclination of the longitudinal beam.

17. In a two-way plow assembly adapted to be carried by a tractor, the combination of a longitudinal beam extending in the direction of normal travel of the plow assembly, a cross member fixed at the forward end of the longitudinal beam, a carrier mounted for movement on the longitudinal beam and provided with ground-engaging plow means, means for turning the carrier relative to the longitudinal beam, support arms fixed at the opposed ends of said cross member adapted to be carried by the tractor whereby the plow assembly may be raised and lowered, draft means pivotally connected to the support arms, and means including longitudinal elements extending forwardly from the support arms in advance of the draft means for varying the inclination of the longitudinal beam.

HARRY A. PURSCHE.

References Cited in the file of this patent

UNITED STATES PATENTS

| Number | Name | Date |
| --- | --- | --- |
| 555,327 | McMillan | Feb. 25, 1896 |
| 964,115 | Moore | July 12, 1910 |
| 1,148,088 | Heylman | July 27, 1915 |
| 1,191,143 | Amiot | July 18, 1916 |
| 1,358,158 | Karn | Nov. 9, 1920 |
| 1,630,576 | Monson | May 31, 1927 |
| 1,797,863 | Graham | Mar. 24, 1931 |
| 1,800,284 | Delaye | Apr. 14, 1931 |
| 1,941,013 | Lindgren et al. | Dec. 26, 1933 |
| 2,153,824 | Collins | Apr. 11, 1939 |
| 2,227,366 | Pridgen | Dec. 31, 1940 |
| 2,354,084 | Geraldson | July 18, 1944 |
| 2,403,360 | Graham | July 2, 1946 |
| 2,440,550 | Martin | Apr. 27, 1948 |

FOREIGN PATENTS

| Number | Country | Date |
| --- | --- | --- |
| 32,273 | France (Addition to 614,733) | May 10, 1927 |
| 40,580 | France (Addition to 691,520) | Apr. 26, 1932 |
| 579,244 | France | July 28, 1924 |
| 691,520 | France | July 15, 1930 |
| 49,222 | Germany | Oct. 21, 1889 |
| 411,607 | Germany | Apr. 6, 1925 |
| 163,473 | Great Britain | May 18, 1921 |
| 162,378 | Switzerland | Sept. 1, 1933 |